United States Patent
Becker et al.

(10) Patent No.: US 9,362,758 B2
(45) Date of Patent: *Jun. 7, 2016

(54) METHOD FOR REDUCING THE TOTAL CHARGE LOSS OF BATTERIES

(71) Applicants: Robert Bosch GmbH, Stuttgart (DE); Samsung SDI Co., Ltd., Yongin-si, Gyeonggi-do (KR)

(72) Inventors: Jens Becker, Stuttgart (DE); Andre Boehm, Kornwestheim (DE); Armin Steck, Kusterdingen (DE); Christian Korn, Stuttgart (DE); Marianne Heizmann, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 157 days.

This patent is subject to a terminal disclaimer.

(21) Appl. No.: 14/218,471

(22) Filed: Mar. 18, 2014

(65) Prior Publication Data
US 2014/0285152 A1    Sep. 25, 2014

(30) Foreign Application Priority Data
Mar. 20, 2013    (DE) .......................... 10 2013 204 885

(51) Int. Cl.
*H02J 7/00*    (2006.01)
(52) U.S. Cl.
CPC ............ *H02J 7/0014* (2013.01); *Y02T 10/7055* (2013.01)
(58) Field of Classification Search
CPC .......................... B60L 11/1866; H02J 7/0014
USPC ................. 320/107–108, 118–121, 127–130, 320/133–137
See application file for complete search history.

(56) References Cited

U.S. PATENT DOCUMENTS

| 2009/0085520 | A1 | 4/2009 | Murao | |
|---|---|---|---|---|
| 2012/0161709 | A1* | 6/2012 | Fujii | H02J 7/0016 320/118 |
| 2014/0292259 | A1* | 10/2014 | Kim | H02J 7/00 320/107 |

FOREIGN PATENT DOCUMENTS

| DE | 10 2009 045 519 A1 | 4/2011 |
|---|---|---|
| DE | 10 2010 002 326 A1 | 8/2011 |
| DE | 10 2012 000 653 A1 | 11/2012 |
| JP | 2002-8732 A | 1/2002 |
| JP | 2009-178040 A | 8/2009 |

\* cited by examiner

*Primary Examiner* — Paul Dinh
(74) *Attorney, Agent, or Firm* — Maginot, Moore & Beck LLP

(57) ABSTRACT

A method for reducing a total loss of charge of battery cells by balancing states of charge includes checking boundary conditions as to whether a vehicle is in the park mode, whether a previous balancing step occurred in the past by at least a defined time period, whether a temperature of a balancing unit lies below an adjustable temperature limit and whether states of charge of all battery cells exceed a minimum state of charge. Additionally, the method includes determining a need for balancing such that a check is made as to whether a maximum difference of all states of charge of all battery cells is greater than an adjustable limit state of charge. Also the method includes, balancing by the balancing units if the first two steps of the method are affirmed. The balancing resistances are connected to respective battery cells for a predetermined time.

11 Claims, 4 Drawing Sheets

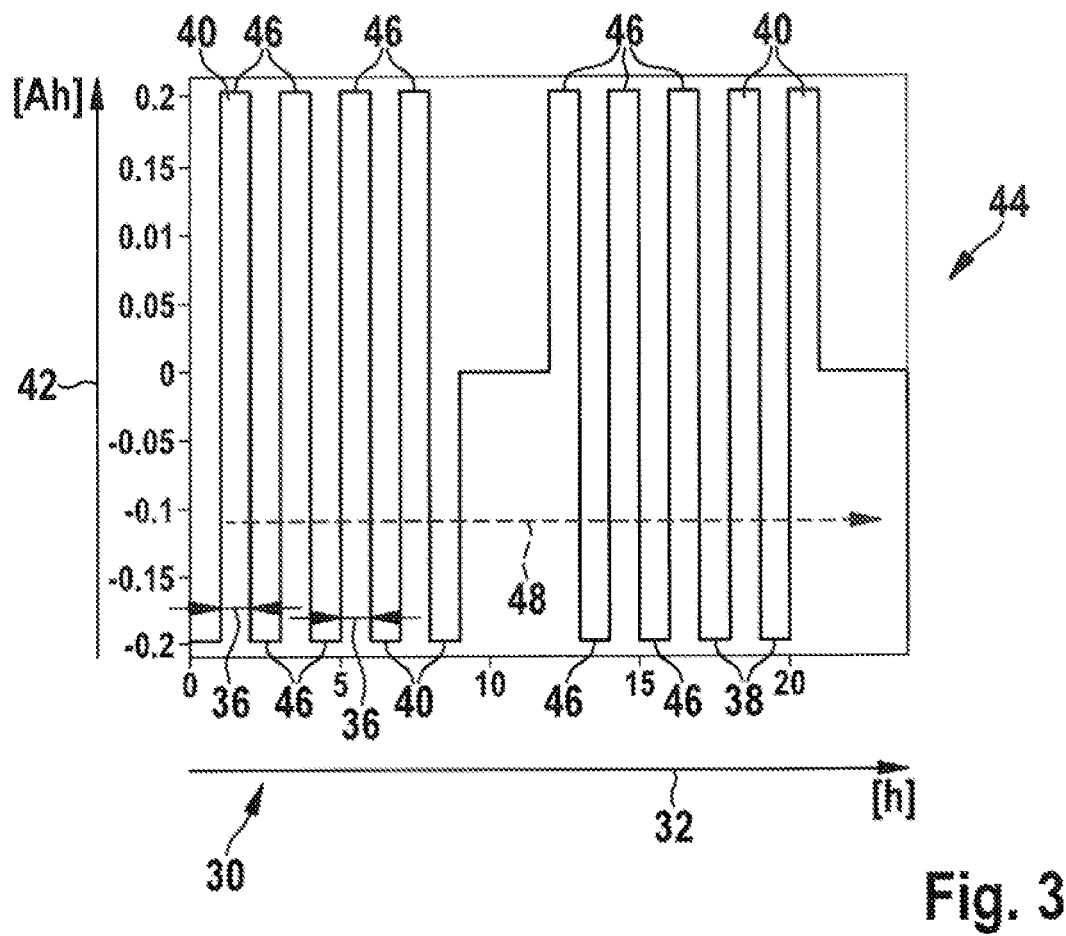
Fig. 3
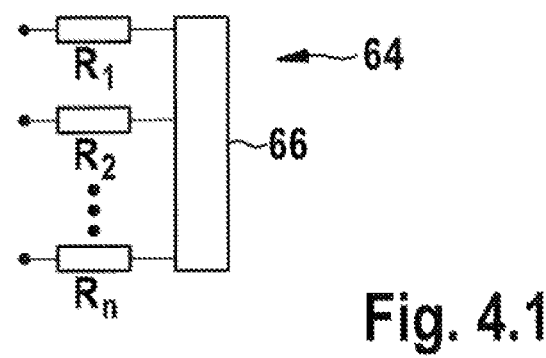
Fig. 4.1

Fig. 4.2

METHOD FOR REDUCING THE TOTAL CHARGE LOSS OF BATTERIES

This application claims priority under 35 U.S.C. §119 to patent application no. DE 10 2013 204 885.8, filed on Mar. 20, 2013 in Germany, the disclosure of which is incorporated herein by reference in its entirety.

BACKGROUND

In hybrid vehicles or in electric vehicles, battery packs with lithium-ion batteries are used, which consist of a large number of electrochemical battery cells connected in series. A battery management system is used to monitor the battery and should guarantee a very long lifetime besides the safety monitoring. For this purpose, it is ensured that the states of charge (State of Charge: SoC) of the individual battery cells are matched to each other despite different self-discharges. This is achieved by suitable cell symmetrization, which is referred to as cell balancing. The cell symmetrization is generally performed resistively, i.e. using at least one Ohmic resistance. For this purpose, a resistance and a switch element are associated with each battery cell in order to be able to discharge individual battery cells via said resistance, which is used for the balancing.

Besides different self-discharging rates of the individual battery cells, the capacitances of the battery cells also deviate from each other as a result of production scatter. This effect is negligibly small at the start of the lifetime of the battery cells, but can increase over the course of the lifetime as a result of differences in cell ageing and can result in capacitance differences of several percent between the individual battery cells.

In battery systems in which the capacitance of the individual battery cells is unknown and the resistive balancing is carried out to a common state of charge, the total charge to be equalized is very high, because charge is unnecessarily discharged via the balancing resistances that is far greater than for purely balancing the different self-discharges.

In the illustration according to FIG. 1, said effect is reproduced graphically. According to FIG. 1, two battery cells 16, 18 are shown with different capacitances, which according to step 1 are initially charged to 50% SoC (State of Charge). The first battery cell 16 has a lower capacitance than the second battery cell 18, which is indicated in FIG. 1 by a shorter length of dash. Charging takes place in step 2. In step 3 balancing back to the same SoC (State of Charge) takes place, i.e. the first battery cell is resistively partially discharged. In the following step 4 discharging of the battery cells 16, 18 takes place. Then the second battery cell 18 must be resistively partially discharged in order to achieve a consistent SoC (State of Charge) relative to the first battery cell 16. The need for balancing during the transition from step 4 to step 5 is partly created by the balancing during the transition from step 2 to step 3. If the battery system is continuously balanced such that all battery cells have an identical equal SoC, not only is charge unnecessarily discharged via the balance resistances required for equalization, i.e. for balancing, but rather there are also unnecessarily many switching processes of the balancing unit, which can adversely affect its service life.

DE 10 2009 045 519 A1 relates to a battery system and a method for balancing the battery cells of said battery system. The battery system comprises a first battery element. The positive pole of the first battery element is conductively connected to the negative pole of the second battery element. A discharging means is provided for the partial discharging of the first and second battery elements. A potential divider is designed, starting from the electrical potential of the negative pole of the first battery element and the electrical potential of the positive pole of the second battery element, to generate a first electrical potential that corresponds to the target value of the electrical potentials on the positive pole of the first battery element and the negative pole of the second battery element. A comparison means is used to compare the first electrical potential with a second electrical potential that is applied to the positive pole of the first battery element and the negative pole of the second battery element. The discharging means is designed to discharge the first battery element if the second electrical potential deviates from the first electrical potential in the positive direction and to discharge the second battery element if the second electrical potential deviates from the first electrical potential in the negative direction.

SUMMARY

The object of the present disclosure is to enable SoC-based balancing and/or balancing without knowledge of the present capacitances of a number of battery cells connected in series such that the loss of charge during balancing is very low and the number of switching cycles of the balancing resistances is reduced and their service life is thereby increased.

According to the disclosure, a method is proposed that has the aim of battery cell symmetrization, i.e. cell balancing, and with which two successive balancing steps on a battery cell are only allowed following the expiry of a minimum time interval. Said minimum time interval is especially adjustable. An upper limit of said time interval arises from the need for cell symmetrization, i.e. for cell balancing, and the balancing charge per equalizing step, i.e. balancing step.

According to the proposed method according to the disclosure, initially a check is made of boundary conditions, whereby a check is made as to whether an electric vehicle or a hybrid vehicle, whose battery modules or whose battery cells are to be balanced, is in park mode. The electric vehicle or hybrid vehicle may not be in either charging mode or discharging mode. A check is further made as to whether the last balancing step was carried out a defined time period ago and that the temperature of a balancing unit, which carries out the equalization of charge differences of battery cells resistively, i.e. by means of a resistance, is smaller than an adjustable temperature limit. Furthermore, in the first step of the method a check is made as to whether the state of charge (SoC) of all battery cells lies above an adjustable limit. In the next step of the method a check is made as to whether there is or is not a need to carry out balancing, i.e. for balancing of states of charge of battery cells. For this purpose, a SoC difference of all battery cells lying above an adjustable limit DELTA_SoC is determined. For this purpose, the minimum SoC SoC_MIN of all battery cells is determined. If it is true for at least one battery cell i that its individual state of charge SoC_i is greater than SoC_MIN by more than DELTA_SoC, there is a need for balancing.

If there is a need for balancing according to the second step of the method and the conditions that are checked in the first step of the method are fulfilled, a balancing step is carried out according to the following boundary conditions:

The unit conducting battery cell balancing carries out autonomous balancing by the relevant balancing units on request connecting balancing resistances $R_{Bal}$ to the respective battery cells that are to be balanced for a certain time. The balancing units may switch off in the event of heating above a temperature threshold, but may not automatically switch on again. In a subsequent fourth step of the method the individual need for balancing is determined for each battery cell. The need for charge of the battery cell i to be removed is computed according to the equation $Q\_i = C\_NOM \cdot (SoC\_i - SoC\_MIN)$ where C_NOM stands for the nominal capacitance of the battery cells. According to the voltage U_OCV for a given state of charge SoC of the cell and the value of the balancing resistance R_bal, using Ohm's law the time during which balancing steps should be conducted is determined according to the following relationship:

$$t\_i = \frac{Q\_i \cdot R\_bal}{U\_OCV(SoC\_i)}$$

where
R_bal is the balancing resistance
Q_i is the charge of cell i to be discharged
SoC_i is the current state of charge of battery cell i
U_OCV is the open circuit battery cell voltage.

In a fifth step of the method each balancing unit i for a relevant battery cell i is connected for time $t\_i$, but for no longer than an adjustable maximum time. The adherence to an upper time limit is used to protect the balancing unit against overheating.

According to the method proposed according to the disclosure, the balancing units, which carry out balancing of states of charge on the battery cells resistively and connect the balancing resistances R_bal to the individual battery cells, switch off automatically in the event of heating above a temperature threshold without, however, automatically switching on again.

The parameters Q_i, R_bal, U_OCV, SoC_i and C_NOM can be adapted according to the respective battery system or the operating strategy. Advantageously, the parameter SoC_MIN is above the desired reserve charge. Advantageously, the state of charge, i.e. the parameter SoC of all battery cells, should lie above an adjustable limit, e.g. 15%, so that deep discharging is not accelerated by cell symmetrization.

The parameter DELTA_SoC defines an allowed SoC variance below which balancing may not take place. If, however, balancing is carried out to said limit, the difference between maximum and minimum states of charge, i.e. the SoC of the battery cells, is just DELTA_SoC. Said value should be selected to be large compared to the uncertainty interval in which the state of charge of the battery cell is determined. The time interval between two balancing steps t_wait (i.e. a defined time period) should be selected to match the maximum number of cycles of the balancing unit. If the balancing unit can cope with e.g. N temperature cycles, the time interval t_wait should be greater than the service life/N. On the other hand, when selecting the time interval t_wait, the difference in the self-discharging rates of the individual battery cells must also be taken into account. The time interval t_wait should only be selected to be large enough for the need for cell symmetrization existing during said time to be able to be balanced out during one balancing step. The duration of each balancing step is to be adapted so that both boundary conditions can be fulfilled, i.e. the number of cycles of the balancing unit and the complete coverage of the need for cell symmetrization.

As a possible variant of the proposed method according to the disclosure for reducing total losses of charge, time management, i.e. the temporally staggered operation of the individual balancing units, can be controlled by means of the battery management system such that instead of all battery cells, individually selected battery cells or subsets of battery cells are also individually subjected to cell balancing. In this case, all battery cells or any subsets of battery cells are provided with a suitable timer. The condition that there is a need for balancing is independently checked for each timer. The resulting advantage is to be seen in that the individual battery cells can be allocated such that all battery cells of a defined subset can be balanced simultaneously without this resulting in excessively rapid and excessively strong heating of the balancing unit that is carrying out the balancing.

The proposed method according to the disclosure enables the performance of equalization of differences in charge, i.e. cell balancing, on battery cells of a battery module of a battery pack for a hybrid vehicle or an electric vehicle, wherein said charge equalization is possible in the event of differences in capacitance of the individual battery cells in relation to each other in the region of 20% without explicit knowledge of the individual battery cell capacitances. How great a capacitance difference that can ultimately be coped with without knowledge of the actual capacitances of the system depends to a not inconsiderable extent on the driving profile. Furthermore, the charge loss that occurs as a result of the cell balancing can be considerably reduced. Furthermore, the service life of the resistances R_bal used for cell balancing can be significantly increased. The proposed method according to the disclosure enables cell balancing to be individually adapted in an advantageous manner to the self-discharge characteristic of single different individual battery cells by selecting a suitable minimum time interval and thus different ageing cycles of individual battery cells can be taken into account. Another advantage connected to the proposed solution according to the disclosure is to be seen in that flexible adaptation of the time period between two balancing steps to the rhythm of the driver is possible. Another striking advantage of the proposed solution according to the disclosure is to be seen in that the service life of the balancing resistances can be extended by time management. The service life can be extended by a restriction on the number of switching cycles. Only so many switching cycles are allowed as on the one hand are needed for balancing and on the other hand are allowed by the discharging means.

BRIEF DESCRIPTION OF THE DRAWINGS

In the figures:
FIG. 3 shows another second charging/discharging profile with a different charging/discharging characteristic, also plotted over 24 H,
FIG. 4.1 shows a balancing unit construction,
FIG. 4.2 shows a flow diagram for performing equalizing measures (cell balancing steps) to be carried out on battery cells with time managers.

DETAILED DESCRIPTION

Figure 1:
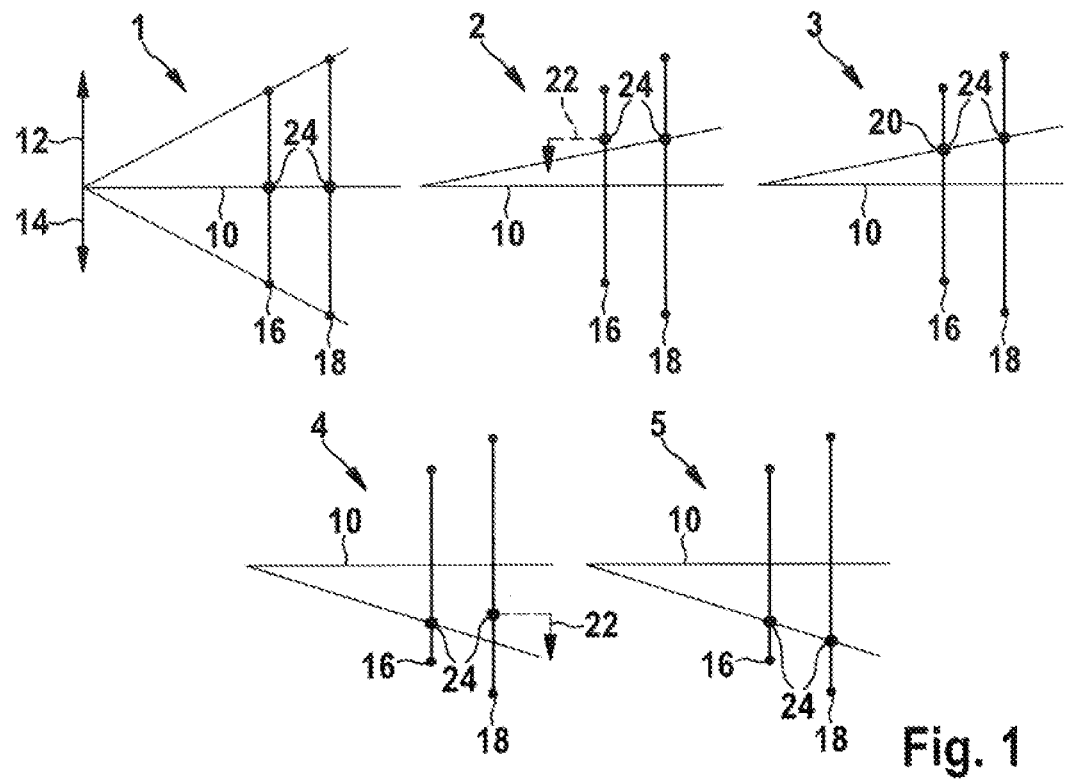
FIG. 1 shows the equalization of different states of charge, i.e. battery cell balancing for maintaining an equal state of charge (SoC) of the two battery cells.

FIG. 1 shows continuous performance of equalizing steps (cell balancing steps) for maintaining an identical state of charge (SoC) of two battery cells 16, 18. Starting from a state of charge 10, a SoC level of 50%, it is illustrated at step 1 in FIG. 1 that a charging process 12 is running in the vertically upward direction in relation to the SoC level 10; during a discharging process it runs in the opposite direction, see reference character 14.

The first battery cell is designated with reference character 16, the other, second battery cell with reference character 18. In the first step according to FIG. 1 both battery cells 16 and 18 have an identical SoC level 10 of 50%. In the second step it can be seen that charging both the battery cells 16, 18 takes place above the SoC level of 50%. Regarding the gradient, during the transition from the second to the third step the first battery cell 16 is to be slightly discharged until, see in the third step, the two SoC levels 24 of the first battery cell 16 and the second battery cell 18 again correspond to each other. The partial discharging in the second step is provided with reference character 22. In the fourth step according to the illustration in FIG. 1, a discharging process 14 of the two battery cells 16, 18 takes place such that the current SoC level 24 falls below the SoC level 10 of 50%. In order to bring both battery cells 16 and 18 back to an identical SoC level, as indicated in step 4, a resistive partial discharging of the second battery cell is necessary, as indicated by reference character 22 in step 4 according to FIG. 1. In step 5 the two battery cells 16 and 18 are again "balanced", i.e. they have an identical SoC level 24 that lies below the SoC level 10 of 50%.

Figure 2:
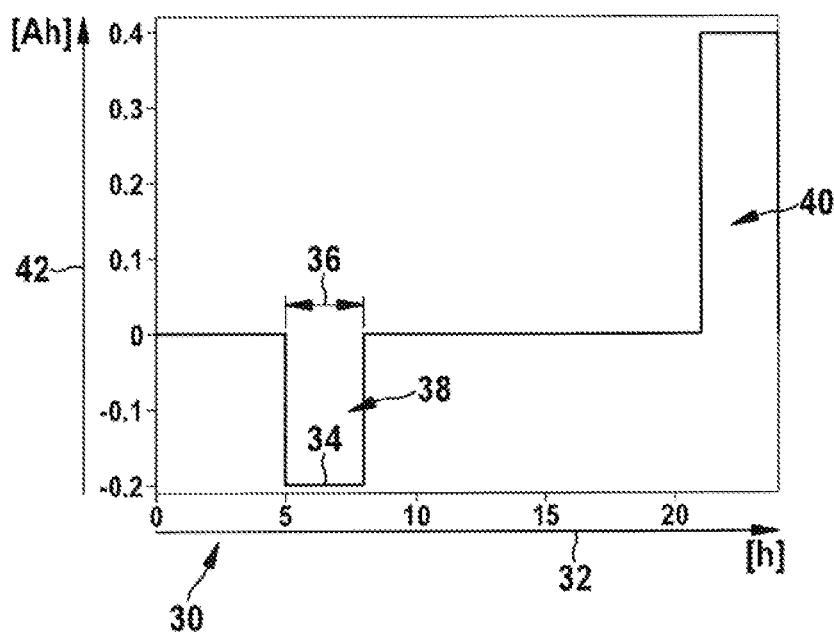
FIG. 2 shows a first periodic charging/discharging profile, plotted over 24 h.

In FIG. 2 a first charging/discharging profile 30 is shown, whereby a charging rate is plotted over time, in the present case over a 24 h day.

From the charging/discharging profile 30 illustrated in FIG. 2 it can be seen that in the daily profile 32 from 5 hours to 8 hours there is a SoC swing 34, during which a battery experiences a long SoC swing during a period 36, i.e. it passes through a discharge phase 38. The discharge phase 38 finishes at 8 hours. At 21 hours a pronounced charging phase 40 follows, which lasts until 24 hours, then the charging rate 42 is again zero.

In contrast, according to FIG. 3 a second charging/discharging profile 44 is shown, in which, e.g. for a taxi vehicle seen over the course of a day 32, there are many short SoC swings 46, i.e. charging and charging phases 38, 40 alternate hourly, wherein four charging phases 40 and five discharging phases 38 occur viewed from late morning until 10 hours. In contrast to the first charging/discharging profile 30 according to the illustration in FIG. 2, the SoC swings 46, the changes in state of charge for the second charging/discharging profile 44 illustrated in FIG. 3, turn out to be significantly more pronounced in terms of amplitude. The occurring SoC swings 46 are counted along the arrow with reference character 48.

Starting from midday, during the afternoon and the early evening up to 20 hours five charging phases 40 are each interrupted by discharging phases 38 of short duration, each approx. barely 1 hour.

Figure 4:
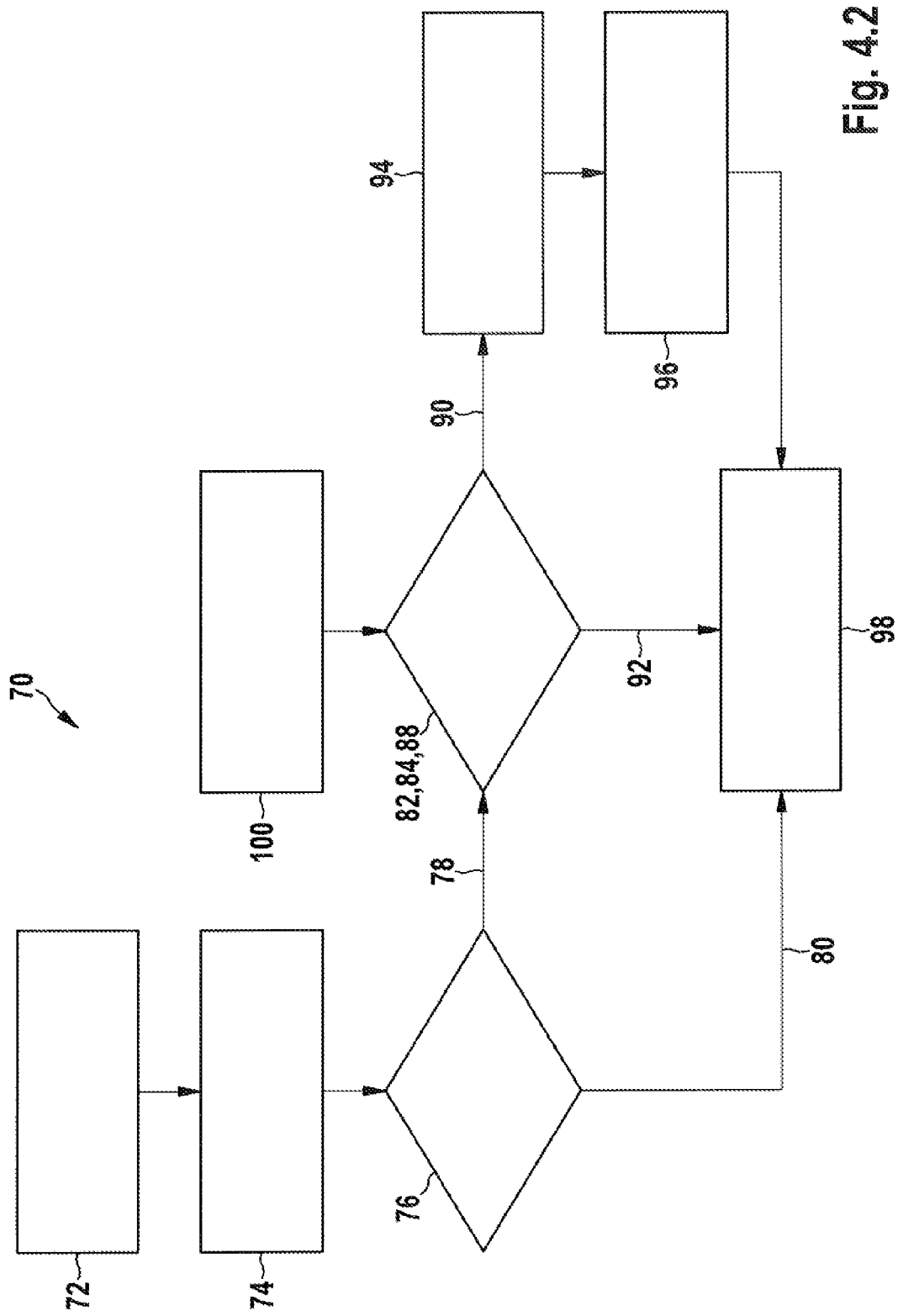

In FIG. 4.1 a circuit design for balancing states of charge is illustrated. Such a balancing unit 64 comprises balancing resistances $R_1, R_2, \ldots, R_n$, which are connected together by means of switching logic 66.

The illustration according to FIG. 4.2 shows a flow chart 70, using which the proposed method according to the disclosure for equalizing differences in charge (cell balancing) according to the proposed solution according to the disclosure is carried out.

A battery management system comprises a Battery Control Unit (BCU), which determines the present state of charge (SoC) of all battery cells 16, 18 connected in series. A balancing unit for each of the battery cells 16 and 18 comprises a number of resistances R_bal that can be connected to one of the battery cells 16, 18, as well as switching logic 66 according to FIG. 4.1.

According to the proposed method according to the disclosure, in a first step of the method a check is made as to whether an electric vehicle or a hybrid vehicle is in the park mode 72 or not. For carrying out the proposed method according to the disclosure for equalizing differences in charge on battery cells 16, 18, an electric vehicle or a hybrid vehicle may not be in the charging mode or in the discharging mode. Furthermore, within the first step of the method a check is made as to whether the state of charge (SoC) of all battery cells lies above an adjustable limit, e.g. above a limit of 15%. Through said prior checking, deep discharging of individual battery cells 16, 18 by cell symmetrization, i.e. by cell balancing, during which charge is discharged, is not accelerated, see Position 74 in the block diagram according to FIG. 4.2. Finally, the boundary condition is checked as to whether a balancing unit 64 has a temperature lying below an adjustable temperature limit of e.g. 40° C. or 45° C., so that the balancing unit 64, i.e. the switching logic 66 and the resistances by means of which the charge equalization on the individual battery cells 16, 18 is carried out with resistive circuitry, can be used. It should be noted that the proposed method according to the disclosure is described here using only two battery cells 16, 18. In practice, i.e. in an actual application, a battery system is used that can contain up to 100 and more battery cells and with which the proposed method according to the disclosure is implemented for charge equalization.

In a decision means 76 a decision is made as to whether an equalizing step for equalizing differences in charge, i.e. cell balancing, is required at all. For this purpose, a maximum state of charge (SoC) difference of all battery cells is formed, which must lie above an adjustable limit DELTA_SoC, e.g. 3%, so that the following condition is fulfilled:

$SoC\_i > SoC\_MIN + DELTA\_SoC$, e.g. 3%

If the need for cell balancing is affirmed in the decision means 76, the process branches to a second branch 80 and in 98 decides to continue normal operation, in the present case to not perform cell balancing.

If by contrast a need for cell balancing is determined in the decision means 76 for at least one of the battery cells 16, 18 and the boundary conditions according to the first step of the method are all fulfilled, the method follows the first branch 78 and a cell balancing step is performed corresponding to the following boundary conditions:

The equalizing process, i.e. the cell balancing, takes place autonomously, i.e. the BCU gives the relevant balancing units 64 the request to connect the resistances R_bal to the respective battery cells 16, 18 for a certain time, so that resistive cell balancing takes place. The balancing units 64 may switch themselves off in the event of heating above a certain temperature threshold, but it is excluded that they automatically switch on again.

If cell balancing is allowed, i.e. the temperature of the balancing unit 64 lies below a temperature of e.g. 40° C. or 45° C., indicated by position 84 in FIG. 4.2 (second condition), and if a third condition 88, i.e. a balancing step is more than t_wait (e.g. 19 h) in the past, and if a first condition 82 is fulfilled, according to which $SoC\_i > SoC\_MIN + DELTA\_SoC$, e.g. 3%, the individual need for balancing is determined for each of the battery cells i. A charge of a battery cell i to be discharged is given according to the following relationship:

$Q\_i = C\_NOM \cdot (SoC\_i - SoC\_MIN)$ where C_NOM corresponds to a normal capacitance of all battery cells 16, 18. According to the voltage value U_OCV, which occurs for a given state of charge of the battery cell i, and the resistance value of the balancing resistance $R_{Bal}$, using Ohm's law the time during which the cell balancing is to be carried out can be determined according to:

$$t\_i = \frac{Q\_i \cdot R\_bal}{U\_OCV(SoC\_i)}$$

where
R_bal is the balancing resistance
Q_i is the charge of cell i to be discharged
U_OCV is the open circuit battery cell voltage
SoC_i is the current state of charge of battery cell i.

The charge equalization, i.e. the balancing, is now only carried out by the BCU, which connects a corresponding balancing resistance R_bal to the corresponding battery cell 16, 18 of the battery cells i during the individually determined time t_i. Said connection takes place for the time t_i, but for no longer than an adjustable maximum time. Said upper time limit, i.e. the maximum time, is used to protect the balancing unit 64 (BCU≙ Balancing Unit) against overheating.

This is indicated by the first branch 90 in the flow chart 70 according to FIG. 4.2, which causes control of the battery control unit 94, so that the resistive cell balancing is performed for a time period of x minutes and a timer reset 96 is triggered at the timer 100 for the corresponding battery cell i being that one of the battery cells at which cell balancing by resistive interconnection is now initiated.

If the conditions 82, 84, 88 are not fulfilled, the method branches via the second branch 92 to the continuation 98 and the same applies for branching from the timer reset 96 to the continuation 98.

The above-mentioned parameters, e.g. Q_i, SoC_i, SoC_MIN, the resistance values of the balancing resistances R_bal etc., can be adapted according to the respective battery system to be equalized in respect of its charge differences of individual battery cells 16, 18 or in respect of the operating strategy of the batteries. Thus e.g. the parameter SoC_MIN should lie above the desired reserve charge. DELTA_SoC defines the allowed variance with respect to the states of charge SoC of the individual battery cells 16, 18, below which cell balancing does not take place. If equalizing of differences in charge should be carried out at said limit, i.e. the allowed SoC variance, the difference between the maximum and minimum states of charge (SoC) of the battery cells 16, 18 just corresponds to DELTA_SoC. This value should in any case be selected such that it is large compared to an uncertainty interval within which the individual state of charge SoC of the battery cells 16, 18 can be determined.

By means of the proposed method according to the disclosure, the service life of the balancing units 64 and hence the service life of the balancing resistances R_bal is increased by the time management such that a time period t_wait of e.g. 12 h and more passes between two balancing steps that are carried out by the balancing unit 64. This ensures that the battery cell balancing does not respond to each difference in state of charge given by respective capacitance differences. By the introduction of time management in connection with the balancing, this can be made much more robust compared to the balancing illustrated in FIG. 1, so that several advantages are achieved. For one thing, the service life of the balancing resistances R_bal is distinctly increased. Furthermore, each balancing unit 64 used carries out significantly fewer switching cycles, because it is mandated or specified that a time period t_wait must elapse between balancing processes. Furthermore, as illustrated in connection with the description of FIG. 1, the number of switching processes for resistive cell balancing can be drastically reduced, so that undesirably draining charge, which is discharged according to the procedure of the prior art for cell balancing, although this may not be necessary, can remain in the battery cells 16, 18, so that the cell balancing is significantly more robust, the proposed method according to the disclosure, i.e. a combination of cell balancing with time management, is used.

Only just as many switching cycles are carried out by the balancing units 64 as are absolutely necessary for the cell balancing and as are just allowed by the discharging means. Besides the above-mentioned time period t_wait of 12 h, time periods t_wait of the order of magnitude of 19 h, 20 h and more, which must elapse between two balancing processes, can also be specified.

Figure 5:
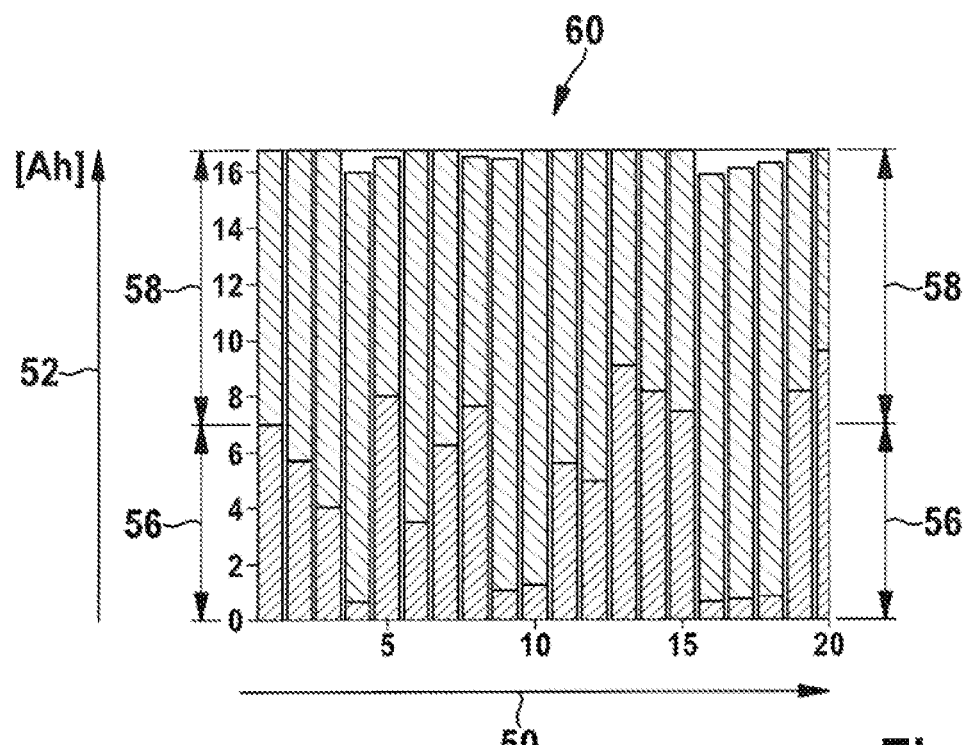
FIG. 5 shows a simulation of the charging/discharging profile according to the illustration in
FIG. 2 with 20 battery cells over 365 days with self-discharging components and balancing steps.
Figure 6:
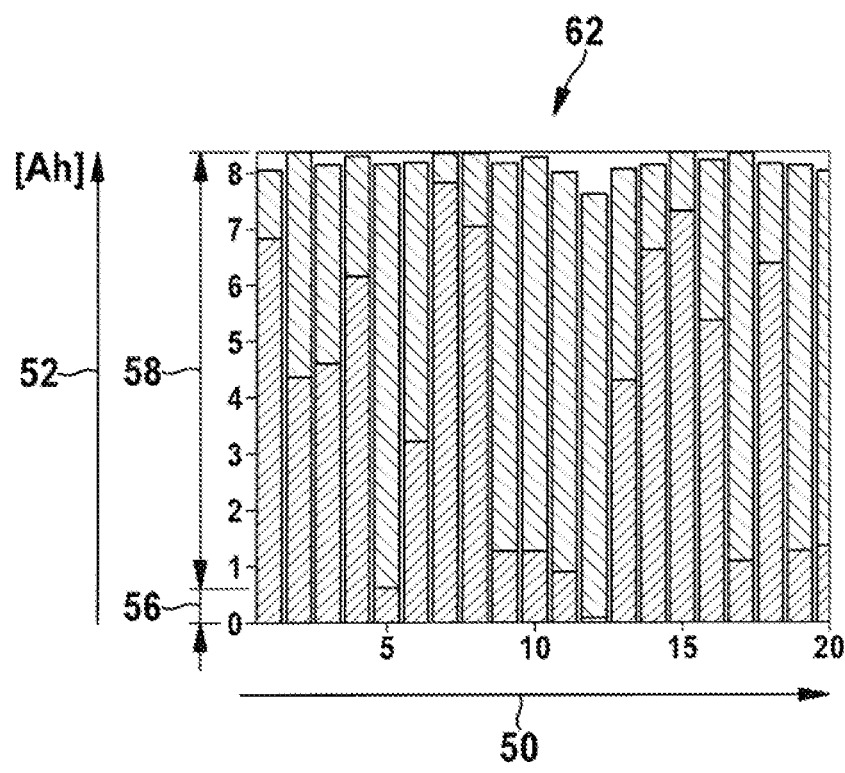
FIG. 6 shows a simulation result of the second discharging/charging profile illustrated in
FIG. 3, also with 20 battery cells over 365 days, also with self-discharging components and cell balancing components.

Balancing profiles 60, 62 that are achievable by using the proposed method according to the disclosure for reducing the total loss of charge, i.e. the proposed cell balancing according to the disclosure, are shown in the illustrations according to FIGS. 5 and 6. In FIGS. 5 and 6, charge losses 52 determined in a simulation time period are given in ampere-hours on the vertical axis in each case. The charge losses 52 are divided into a part that is due to self-discharging 56 and a part that is due to balancing steps 58. If the first charging/discharging profile 30 illustrated in FIG. 2 is simulated for a number of battery cells 50 of twenty items over 365 days, it can be seen that the total charge loss that is due to self-discharging 56 can be equalized by the balancing steps 58 over each of the battery cells 1 to 20, so that viewed overall a uniform state of charge of all twenty battery cells is achieved.

Regarding the simulation result that is illustrated in FIG. 6, and a charging/discharging cycle as illustrated in FIG. 3, simulation gives similar results. In this case, where the simulation result is shown in the same way as in FIG. 5, the self-discharges 56 are sometimes significantly higher compared to the components of the balancing steps 58.

| Reference Character List | |
|---|---|
| 1 | step 1 - initial charging to 50% SoC (State of Charge) |
| 2 | step 2 - charging |
| 3 | step 3 - balancing back to the same SoC (State of Charge) |
| 4 | step 4 - discharging of the battery cells |
| 5 | step 5 - restoring the balance of the two battery cells 16 and 18 |
| 10 | SoC level, charge state |
| 12 | charging process |
| 14 | discharging process |
| 16 | battery cell |
| 18 | battery cell |
| 22 | resistive partial discharging |
| 24 | SoC level |
| 30 | first charging/discharging profile |
| 32 | the course of the day |
| 34 | SoC swing |
| 36 | period of discharge phase 38 |
| 38 | discharge phase |
| 40 | charging phase |
| 42 | charging rate |
| Ah | ampere-hours |
| h | hours |
| 46 | short SoC swings |
| 48 | SoC swing counting direction |
| 50 | number of battery cells |
| 52 | charge losses |
| 56 | self-discharging charge losses |
| 58 | balancing step charge losses |
| 60 | balancing profile |
| 62 | balancing profile |

Reference Character List

| | |
|---|---|
| 64 | balancing unit |
| 66 | switching logic |
| $R_1$ | balancing resistance |
| $R_2$ | balancing resistance |
| 70 | cell balancing flow chart |
| 72 | park mode |
| 74 | not stated |
| 76 | decision means |
| 78, 80, 90, 92 | branches of flow chart |
| 82, 84, 88 | conditions |
| 94 | battery control unit |
| 96 | timer reset |
| 98 | continuation |
| 100 | timer |

What is claimed is:

1. A method for reducing a total loss of charge of battery cells by balancing states of charge (SoC) of the battery cells, comprising:
   a) checking boundary conditions as to whether
      a previous balancing step is in the past by at least a time interval,
      a temperature of a balancing unit lies below an adjustable temperature limit, and
      the SoC of all battery cells are greater than a parameter SoC_MIN;
   b) determining a need for balancing according to whether a maximum difference of all SoC of all the battery cells is greater than a parameter DELTA_SoC;
   c) if steps a) and b) of the method are affirmative, balancing of the battery cells by the balancing unit takes place, during the balancing for a time (t_i) balancing resistances R_bal are connected to respective battery cells, with $$t\_i = \frac{Q\_i \cdot R\_bal}{U\_OCV(SoC\_i)}$$

wherein
Q__i ≙ charge of a battery cell i of the battery cells to be discharged,
U_OCV ≙ open circuit battery cell voltage,
SoC_i ≙ state of charge of the battery cell i, and
R_bal ≙ resistance value of the balancing resistance; and
   d) selecting the time interval between two balancing steps such that this corresponds to a performance of a maximum number of cycles of the balancing unit.

2. The method according to claim 1, wherein according to step c) the charge Q_i of the battery cell i to be discharged is determined according to the following relationship:
Q_i ≙ C_NOM·(SoC_i−SoC_MIN) with
C_NOM ≙ nominal capacitance of the battery cells.

3. The method according to claim 1, wherein according to step b) the need for balancing is affirmed if for at least one of the battery cells the individual state of charge SoC_i of the battery cell i is greater than the parameter SoC_MIN by more than the parameter DELTA_SoC.

4. The method according to claim 1, wherein the balancing units automatically switch off in the event of heating above a temperature threshold and remain switched off.

5. The method according to claim 1, wherein the balancing units remain connected for time t_i, but for no longer than an adjustable maximum time.

6. The method according to claim 1, wherein the parameter SoC_MIN, the minimum state of charge of an individual battery cell i of the battery cells, lies above a desired reserve charge.

7. The method according to claim 1, wherein the parameter DELTA_SoC defines an allowed SoC variance, below which no balancing steps are carried out.

8. The method according to claim 1, wherein in the event of a balancing process balancing takes place to the parameter DELTA_SoC and a difference between a maximum and a minimum state of charge of the battery cells just corresponds to the parameter DELTA_SoC.

9. The method according to claim 1, wherein the time interval is selected to be of such a magnitude that a need for symmetrization arising during the time interval is equalized during one balancing step.

10. The method according to claim 1, wherein a maximum number of cycles of the balancing unit and a coverage of any need for symmetrization by the time t_i of a balancing step are matched to each other.

11. The method according to claim 1, wherein individual battery cells or subsets of the battery cells are individually balanced.

* * * * *